United States Patent [19]
Sakata

[11] Patent Number: 5,697,065
[45] Date of Patent: Dec. 9, 1997

[54] MOBILE COMMUNICATION SYSTEM AND CONTROL METHOD FOR SETTING THE INITIATION OF DATA COMMUNICATION

[75] Inventor: Masayuki Sakata, Tokyo, Japan

[73] Assignee: NEC Corporation, Tokyo, Japan

[21] Appl. No.: 527,204

[22] Filed: Sep. 12, 1995

[30] Foreign Application Priority Data

Sep. 13, 1994 [JP] Japan .................................. 6-218574

[51] Int. Cl.⁶ ........................................................ H04B 7/00
[52] U.S. Cl. ............................ 455/54.1; 379/98; 379/100
[58] Field of Search ................................ 455/33.1, 54.1, 455/54.2, 56.1, 66; 379/94, 97, 98, 100; 358/434, 435, 436, 438, 439, 442; 375/220, 222

[56] References Cited

U.S. PATENT DOCUMENTS

| | | | |
|---|---|---|---|
| 3,908,086 | 9/1975 | Marino et al. | |
| 4,415,774 | 11/1983 | Driver . | |
| 4,592,069 | 5/1986 | Redding | 375/8 |
| 5,426,511 | 6/1995 | Nagatomo | 455/66 |
| 5,473,675 | 12/1995 | Chapman et al. | 379/98 |
| 5,519,763 | 5/1996 | Namekawa et al. | 379/100 |

FOREIGN PATENT DOCUMENTS 60-22837  2/1985  Japan .

OTHER PUBLICATIONS

*Research & Development Center for Radio Systems (RCR) Foundation*, RCR Standard (27B Annex), pp. 85–125.

*Primary Examiner*—Edward F. Urban
*Attorney, Agent, or Firm*—Sughrue,Mion,Zinn,Macpeak & Seas, PLLC

[57] ABSTRACT

A mobile communication system and a method for controlling this mobile communication system for a data communication using modems. A data communication is surely commenced from a voice communication condition irrelevant to initiation timing of mobile units employed in this system and also communication direction mode setting conditions of modem units. A mobile switching additional unit is provided in a mobile communication switching station and a connection adaptor is provide in the mobile station which has a mobile unit, a modem unit and a data terminal. In accordance with an instruction of initiation of data communication, the connection adaptor connects the data terminal and the modem to the mobile unit, and sets the communication direction mode to an opposite mode to the mode being set to the modem. The connection adaptor also instructs the mobile switching additional unit to set the mode to an opposite mode of the mode which has been set to the connection adaptor.

2 Claims, 5 Drawing Sheets

MU --- MOBILE UNIT
DT --- DATA TERMINAL

MOBILE COMMUNICATION SYSTEM AND CONTROL METHOD FOR SETTING THE INITIATION OF DATA COMMUNICATION

BACKGROUND OF THE INVENTION

1. Field of the Invention

The present invention relates to a mobile communication system and a control method thereof. More specifically, the present invention is related to a mobile communication system for data communication utilizing a modem (modulator-demodulator) and a control method thereof.

2. Description of the Related Art

Conventionally, a method of data communication using a modem unit in the mobile communication system have been proposed. For instance, Japanese Laid-open Patent Application No. 60-22837 opened in 1985 discloses the technology of the data communication of the image data such as facsimile information in the mobile communication network using a facsimile terminal as the data terminal being connected via the modem unit to the mobile unit.

FIG. 3 is a block diagram showing a conventional mobile communication system for data communication. More. specifically, the data communication between two data terminals, each of which is connected to the mobile unit through the modem unit, is performed via the mobile communication network as an ordinary mobile communication call.

In this drawing, reference numerals 1 and 2 indicate mobile stations each of which consists of a mobile unit 14 or 24, a modem 12 or 22, a connection adaptor 13 or 23 and a data terminal 11 or 21 as for the mobile communication service user equipment. The mobile unit 14 or 24 is the unit for transmitting/receiving radio signals used for the mobile communication and for controlling entire mobile communication calls at the mobile communication service user side, the modem unit 12 or 22 is the unit for modulating/demodulating the data form of the communication and for controlling the communication channels, the connection adaptor 13 or 23 is the adaptor for connecting the modem unit to the mobile unit and the data terminal 11 or 21 is the terminal for communicating the data information through the mobile unit and the mobile communication network.

As for the mobile communication network equipment, mobile communication switching stations 31, 32 which are interconnected each other by a transmission line 43, mobile radio communication channel control stations 33, 34 each of which is connected to and controlled by the mobile communication switching station 31 and 32 respectively and a plurality of radio base stations 35, 36 which control the mobile radio communication channels are involved.

The mobile communication switching stations accommodate the mobile stations 1 and 2 as the subscribers of the mobile communication service of this network and perform the switching operation of mobile communication calls related to the mobile stations 1 and 2. Reference numerals 37 and 38 indicate mobile switching additional units connected to the mobile communication switching stations 31 and 32 respectively, for controlling the data communications based upon a required data transmission control protocols. Furthermore, reference numerals 41 and 42 represent radio channels used for radio communications between the radio base stations 35, 36 and the mobile units 14, 24.

Referring now to FIG. 4, operations of the data communication in the conventional mobile communication system will be described.

FIG. 4 is a connection sequence diagram for explaining the system operations prior to commence the data communication between the mobile stations in particular, the control sequence employed in this mobile communication systemo corresponds to the control sequence proposed by the RCR standard (27B annex) issued by The Research & Development Center for Radio Systems (RCR) Foundation, based on the data communication call control sequence with using the modem unit in the mobile communication.

In FIG. 4, symbol "ORG" indicates that the apparatus is under the originate mode (call outgoing side) in the respective call control sequences, and symbol "ANS" denotes that the apparatus is under the answer mode (call incoming side). In this case, it is assumed that the modem unit 12 is preset to the answer mode, whereas the modem unit 22 is preset to the originate mode.

Generally speaking in the mobile communication network, the data communication is commenced after the speech path for the voice communication has been established. In response to the commencement of the data communication, the mobile switching additional units 37 and 38 for controlling the data communication based on a preselected call control sequence are connected to the mobile communication switching stations 31 and 32. In accordance with the call control sequence defined by the RCR standard, the connection adaptors 13, 23 in the mobile stations 1, 2 are connected to the mobile switching additional units 37, 38 respectively through the radio channels 41, 42. Also, the existing call control sequence is controlled, so that the modem units 12, 22 in the mobile stations 1, 2 are connected to the connection adaptors 13, 23 respectively, and further the mobile switching additional unit 37 in the mobile communication switching station 31 is connected to the mobile switching additional unit 38 in the mobile communication switching station 32, and thus the data communication is commenced.

It is now assumed that the radio base stations 35 and 36 are connected via the radio channels 41 and 42 to the mobile units 14 and 24 respectively, a call (a speech channel) has been established between these mobile units 14 and 24 through such a route defined by the mobile unit 14, radio channel 41, radio base station 35, mobile communication radio channel control station 33, mobile communication switching station 31, transmission line 43, mobile communication switching station 32, mobile communication radio channel control station 34, radio base station 36, and mobile unit 24, and a communication is being performed in a voice (speech) manner.

Under such conditions, when a mobile communication service user requests the data communication, an instruction (data communication start instruction) for transferring the communication mode to the data communication is entered into the mobile unit 14. Then, the data communication start request information is issued from the mobile unit 14 to the mobile communication switching station 31 in response to this transfer instruction, and then the mobile switching additional unit 37 is initiated by the mobile communication switching station 31 in response to this request information.

In response to the initiation, the conventional mobile switching additional units 37, 38, and connection adaptors 13, 23 are brought into the originate mode, which will be automatically changed into the answer mode if the counter party to be connected will not brought into the answer mode within a preselected time period, for example, 10 seconds. Thus, in response to the above-described initiation, the mobile switching additional unit 37 is brought into the originate mode, and a response with respect to the data communication start request information is returned from the mobile switching additional unit 37 to the mobile station 14.

As a result, since the connection adaptor 13 is initiated by the mobile unit 14 and brought into the originate mode whereas the modem unit 12 is the answer mode, the connection adaptor 13 is connected to the modem 12 by way of the existing call control sequence, so that the bidirectional data transfer mode is established.

Then, the establishment of the data transfer mode in the mobile station 1 is indicated by transferring the connection completion (LRC) information from the connection adaptor 13 which is under originate mode, and this connection completion (LRC) information is recognized by the mobile switching additional unit 37, so that the data transfer operation can be established between this connection adaptor 13 and the mobile switching additional unit 37.

On the other hand, it is assumed that the other party of the mobile communication service user using the mobile station 2 also requests the data communication commencement by putting the instruction for transferring the communication mode to the data communication into the mobile unit 24 a little later than the operation of the user using the mobile station 1. In response to this transfer instruction, the data communication start request information is issued from the mobile unit 24 to the mobile communication switching station 32. Upon receipt of this request information, the mobile switching additional unit 38 is initiated by the mobile communication switching station 32, so that the mobile switching additional unit 38 is brought into the originate mode in a similar manner to the above-described case, and also a response with respect to the data communication start request information is returned from the mobile switching additional unit 38 to the mobile unit 24.

As a consequence, although the connection adaptor 23 is initiated as the originate mode, since the modem unit 22 is under originate mode, no connection is established between them based upon the existing call control sequence, so that the mobile communication system is brought into the waiting state up to 10 seconds from the initiation.

Now, since the mobile switching additional unit 37 has been initiated prior to the mobile switching additional unit 38, this mobile switching additional unit 37 is transferred to the answer mode after 10 seconds have elapsed from the initiation prior to the mobile switching additional unit 38. At this time, as the mobile switching additional unit 38 is still in the originate mode, these additional units 37 and 38 are connected to each other, thereby to be brought into the data transfer operation. Then, the connection completion indicative of this data transfer operation is sent from the mobile switching additional unit 38 under originate mode and is confirmed by the connection adaptor 23, so that the data transfer operation can be established between them.

Furthermore, since the connection adaptor 23 is brought into the answer mode after 10 seconds have elapsed from the initiation and the modem unit 22 is preset to the originate mode, the connection adaptor 23 is connected to the modem unit 22 in accordance with the existing call control sequence, and thus are brought into the data transfer operation, so that the modem units 12 and 22 have been connected with each other.

As described above, when the modem unit 12 connected to the connection unit 13, which is initiated earlier, has been preset to the answer mode and the modem unit 22 connected to the connection unit 23, which is initiated later, has been preset to the originate mode, since the connection adaptor 13 is brought into the originate mode especially between the connection adaptor unit 13 and the mobile switching additional unit 37, the connection completion (LRC) is sent from the connection adaptor 13 to the mobile switching additional unit 37, and the connection completion established between the modem unit 12 and the connection adaptor 13 is reported to the mobile switching additional unit 37. As a result, both the connection adaptor 13 and the mobile switching additional unit 37 are brought into the data transfer operation, so that the data communication is commenced between the data terminals 11 and 21.

Accordingly, in such a conventional mobile communication system, since the connection adaptors 13, 23 and the mobile switching additional units 37, 38 are brought into the originate modes during the initiation states thereof, and are automatically switched into the answer mode after a predetermined time has passed, if the modem unit 12 connected to the connection adaptor 13, which is initiated earlier, has been preset to the originate mode, then both of the mobile switching additional unit 37 and the connection adaptor 13, which are initiated from the mobile unit 14 are brought into the answer mode, and thus no connection completion is sent from non of them. Therefore, there are such problems that no data transfer operation can be established between the connection adaptor 13 and the mobile switching additional unit 37, and the data communication is not commenced.

FIG. 5 shows a connection sequence diagram for explaining operations prior to the commencement of the data communication. In this case, it is assumed that the modem unit 12 is preset to the originate mode, and the modem unit 22 is preset to the answer mode.

First, the instruction for transferring the communication mode to the data communication is put into the mobile unit 14, and in response to this transfer instruction, the data communication start request information is sent from the mobile unit 14 to the mobile communication switching station 31, so that the mobile switching additional unit 37 is initiated by the mobile communication station 31 to be brought into the originate mode, and also a response to this data communication start request information is returned to the mobile unit 14.

As a result, the connection adaptor 13 is initiated by the mobile unit 14 to be brought into the originate mode. However, since the modem unit 12 is preset to the originate mode, which is the reverse condition in the previous description, the connection adaptor 13 is brought into the waiting condition for a predetermined time, e.g., 10 seconds in this case.

On the other hand, the instruction for transferring the communication mode to the data communication is also put into the mobile unit 24 in a little later than the operation for the mobile unit 14. In response to this transfer instruction, the data communication start request is issued from the mobile unit 24 to the mobile communication switching station 32. Upon receipt of this request information, the mobile switching additional unit 38 is initiated by the mobile communication switching station 32, so that the mobile switching additional unit 38 is brought into the originate mode, and also a response with respect to the data communication start request information is returned from the mobile switching additional unit 38 to the mobile unit 24.

As a consequence, since the connection adaptor 23 is initiated as the originate mode, and the modem unit 22 is preset to the answer mode, the data transfer operation can be established between the connection adaptor 23 and the modem unit 22 in accordance with the existing call control sequence. Thus, the connection completion is sent from the connection adaptor 23 under the originate mode, which is recognized by the mobile switching additional unit 38, and then the data transfer operation can be established between the connection adaptor 23 and the mobile switching additional unit 38.

Furthermore, since the mobile switching additional unit 37 has been initiated prior to the mobile switching additional unit 38, this mobile switching additional unit 37 is transferred to the answer mode after 10 seconds have elapsed from the initiation. Since the mobile switching additional unit 38 is still under originate mode at this time, the data transfer operation can be established between the mobile switching additional units 37 and 38 by the existing call control sequence.

At this time, since the mobile switching additional unit 38 is under originate mode, the connection completion representative of the connection established between the mobile switching additional units 37 and 38 is transferred to the connection adaptor 23, but is not transferred to the connection adaptor 13.

Also, since the connection adaptor 13 is automatically brought into the answer mode after 10 seconds have elapsed from the initiation and the modem unit 12 is preset to the originate mode, the data transfer operation may be established between the connection adaptor 13 and the modem unit 12 in accordance with the existing call control sequence. However, since the connection adaptor 13 is under answer mode, no connection completion is sent to the mobile switching additional unit 37, and the data transfer operation cannot be established between the connection adaptor 13 and the mobile switching additional unit 37. Therefore, there is another problem that the data communication cannot be commenced.

SUMMARY OF THE INVENTION

The present invention has been made to solve such various problems of the conventional mobile communication system, and therefore, has an object to provide a mobile communication system and a control method thereof capable of firmly commencing a data communication irrelevant to initiation timings of various apparatuses and also mode setting states of a modem unit employed in this mobile communication system.

To achieve the above-described object, a mobile communication system, according to one aspect of the present invention, is characterized by comprising a connection adaptor, instead of conventional connection adaptor, preset to a mode opposite to that of modem units adjacent to the connection adaptor, which is operated in the preset mode when being initiated from the mobile unit based on a predetermined data communication start instruction, and also issues a mode setting instruction to the mobile switching additional unit so as to set a mode thereof opposite to the mode; and a mobile switching additional unit, instead of conventional switching additional unit, operable in a mode set by the mode setting instruction issued from the connection adaptor.

Furthermore, a control method for a mobile communication system, according to another aspect of the present invention, comprising the steps of:

requesting an initiation of data communication during voice communication through the mobile unit;

connecting the data terminal and modem to the mobile unit through the connection adaptor;

activating the mobile switching additional unit and making path from the mobile switching additional unit to the connection adaptor;

setting the communication direction mode of the connection adaptor to an opposite mode of the mode being set to the modem;

sending an instruction of setting a communication direction mode from the connection adaptor to the mobile switching additional unit to an opposite mode of the mode having been set to the connection adaptor; and setting said communication direction mode of the mobile switching additional unit to a mode being instructed.

As a consequence, the mode opposite to that of the modem unit located adjacent to the connection adaptor is set to this connection adaptor. The connection adaptor also issues the mode setting instruction to the mobile switching additional unit in response to this mode setting instruction, the mobile switching additional unit is operated in the mode opposite to that of the connection adaptor.

BRIEF DESCRIPTION OF THE DRAWINGS

The present invention will be described in further detail with reference to the accompanying drawings, in which.

DETAILED DESCRIPTION OF THE PREFERRED EMBODIMENTS

Referring now to drawings, a mobile communication system and a control method thereof, according to the present invention, will be described.

Figure 1:
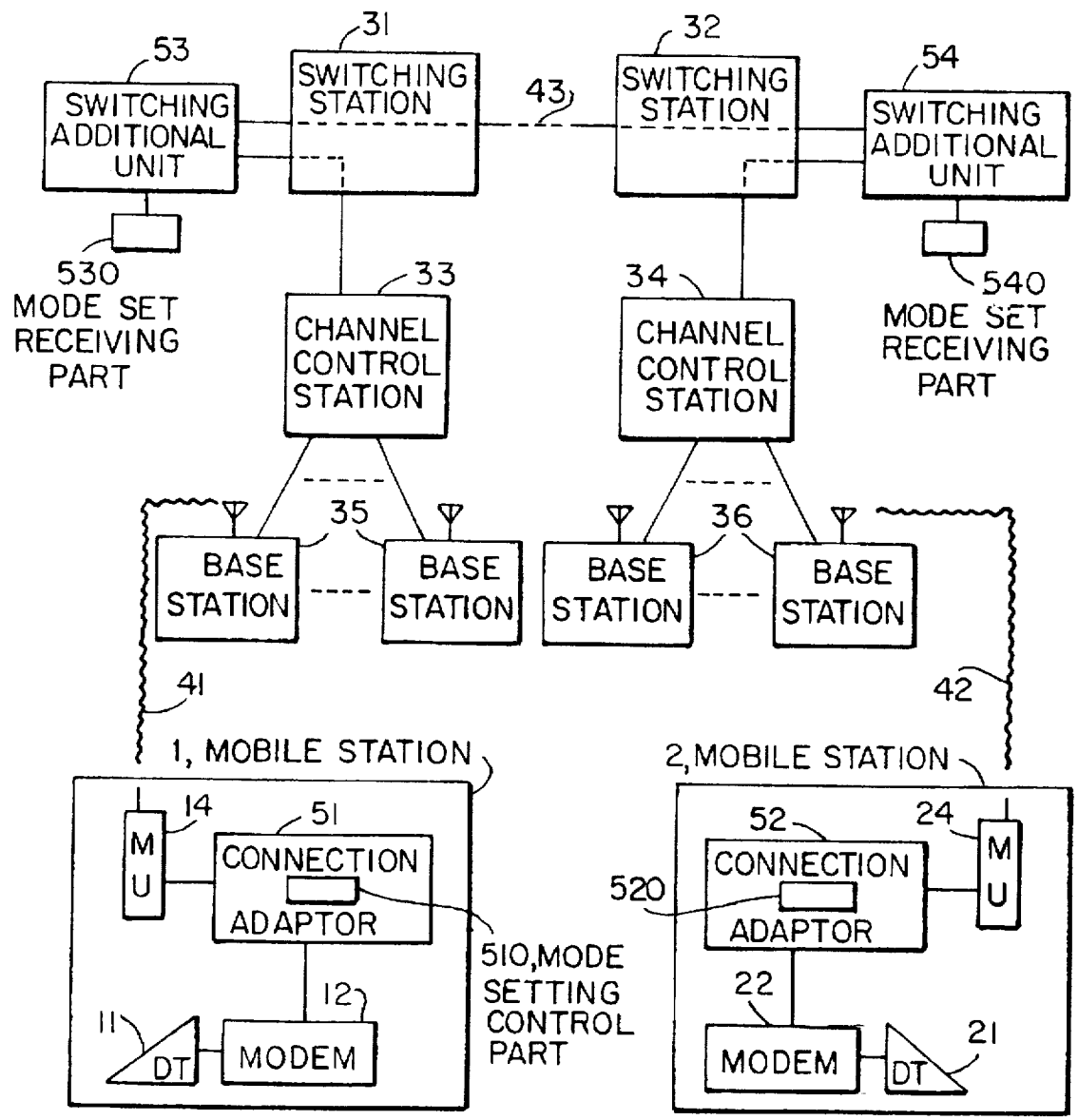
FIG. 1 is a schematic block diagram for showing an arrangement of a mobile communication system according to an embodiment of the present invention.
Figure 3:
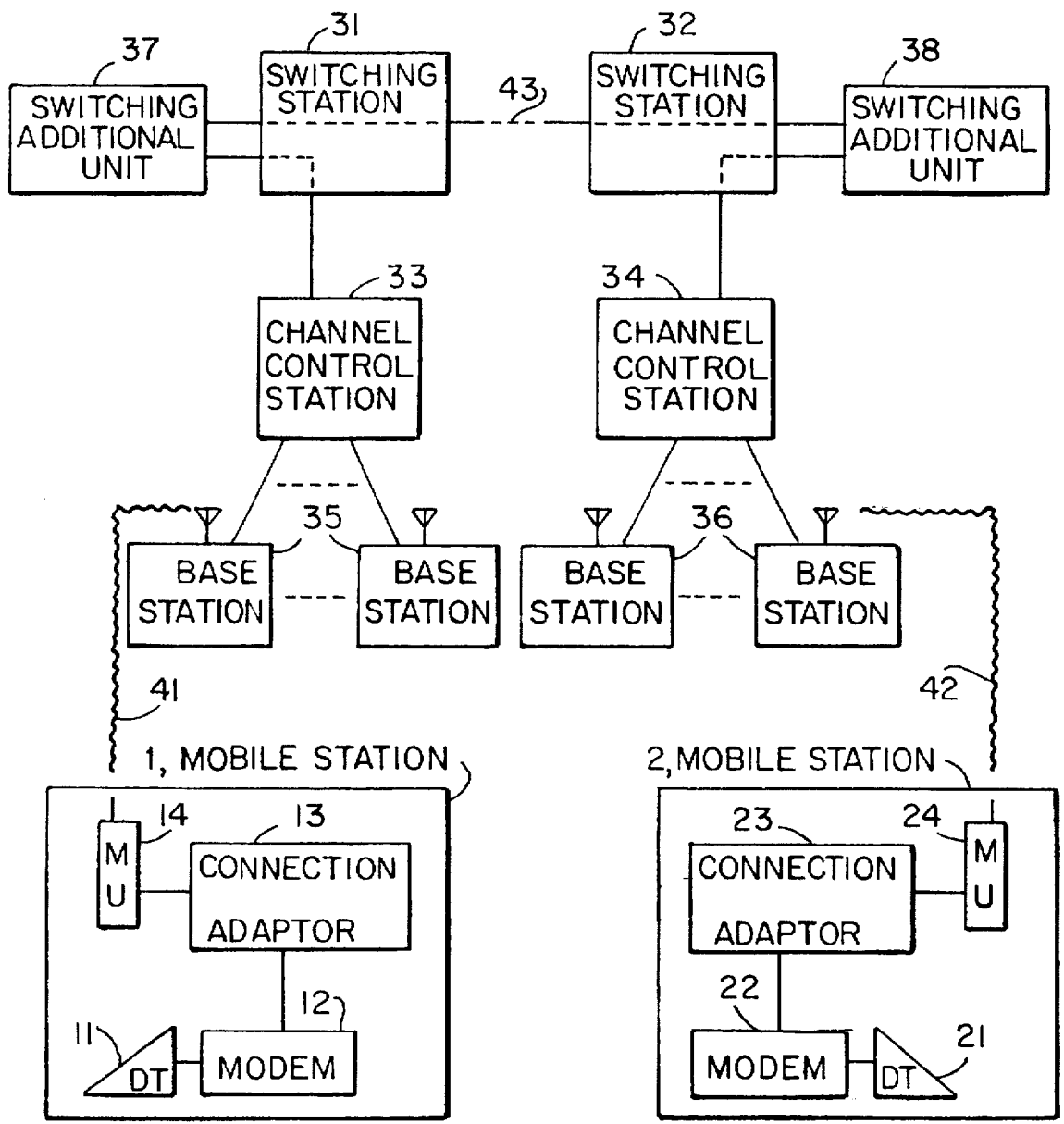
FIG. 3 is a schematic block diagram for indicating the arrangement of the conventional mobile communication system.
Figure 4:
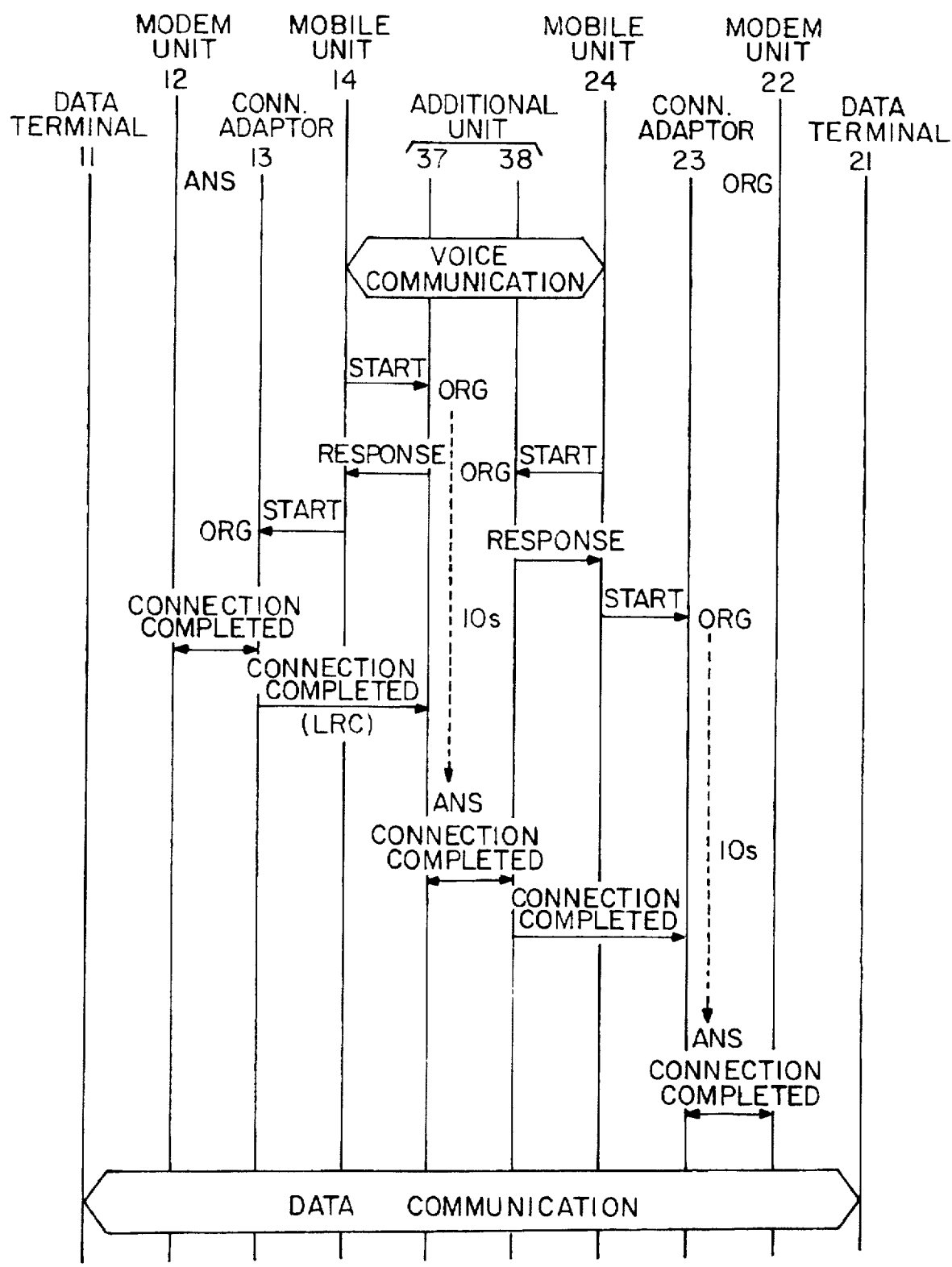
FIG. 4 is the connection sequence diagram for illustratively explaining the operations of the conventional mobile communication system up to the commencement of the data communication.
Figure 5:
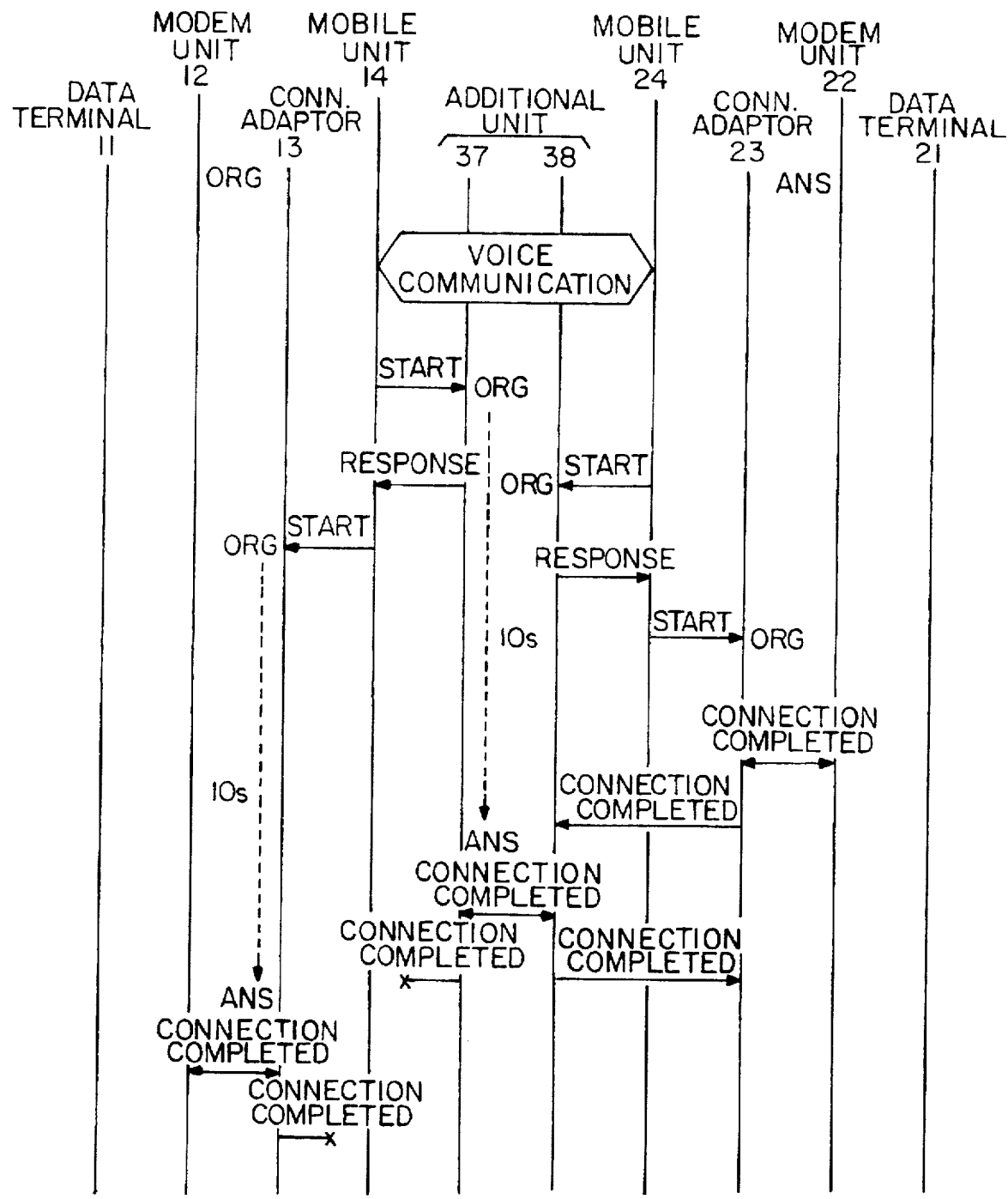
FIG. 5 is the connection sequence diagram for illustratively explaining the operations of the conventional mobile communication system up to the commencement of another data communication.

FIG. 1 is a schematic block diagram for representing an arrangement of a mobile communication system according to an embodiment of the present invention. It should be noted that the same reference numerals shown in FIG. 3 will be employed as those for denoting the same or similar constructive elements of FIG. 1.

That is, in FIG. 1, reference numerals 51 and 52 indicate mobile unit-to-modem connection adaptors (will be simply referred to "connection adaptors" hereinafter) for connecting the modem units 12, 22 to the mobile units 14, 24. Each of connection adaptors 51 and 52 has a mode set control part 510 or 520. The mode set control part is so arranged to set the connection adaptor to either of an originate mode or an answer mode depending on the mode of modem unit which is connected to the connection adaptor. The mode set control part also has a function for transferring a mode setting instruction to the corresponding mobile swiching additional unit.

Reference numerals 53 and 54 represent mobile switching additional units connected to the mobile communication switching stations 31 and 32, for controlling data communications based upon a predetermined transmission control sequence in response to an initiation during the data communication. Each of the mobile switching additional units 53 and 54 has a mode set receiving part 530 or 540. The mode set receiving part is so arranged to receive mode set instruction sent from corresponding connection adaptor. Therefore, the mobile switching additional units 53 and 54 do not set the modes when these mobile switching additional units 53 and 54 are initiated by the mobile units 14 and 24, but are operable in a preselected mode in response to the mode setting instructions issued from the connection adaptors 51 and 52.

Operations of the mobile communication system according to this embodiment of the present invention will now be described with reference to FIG. 2.

Figure 2:
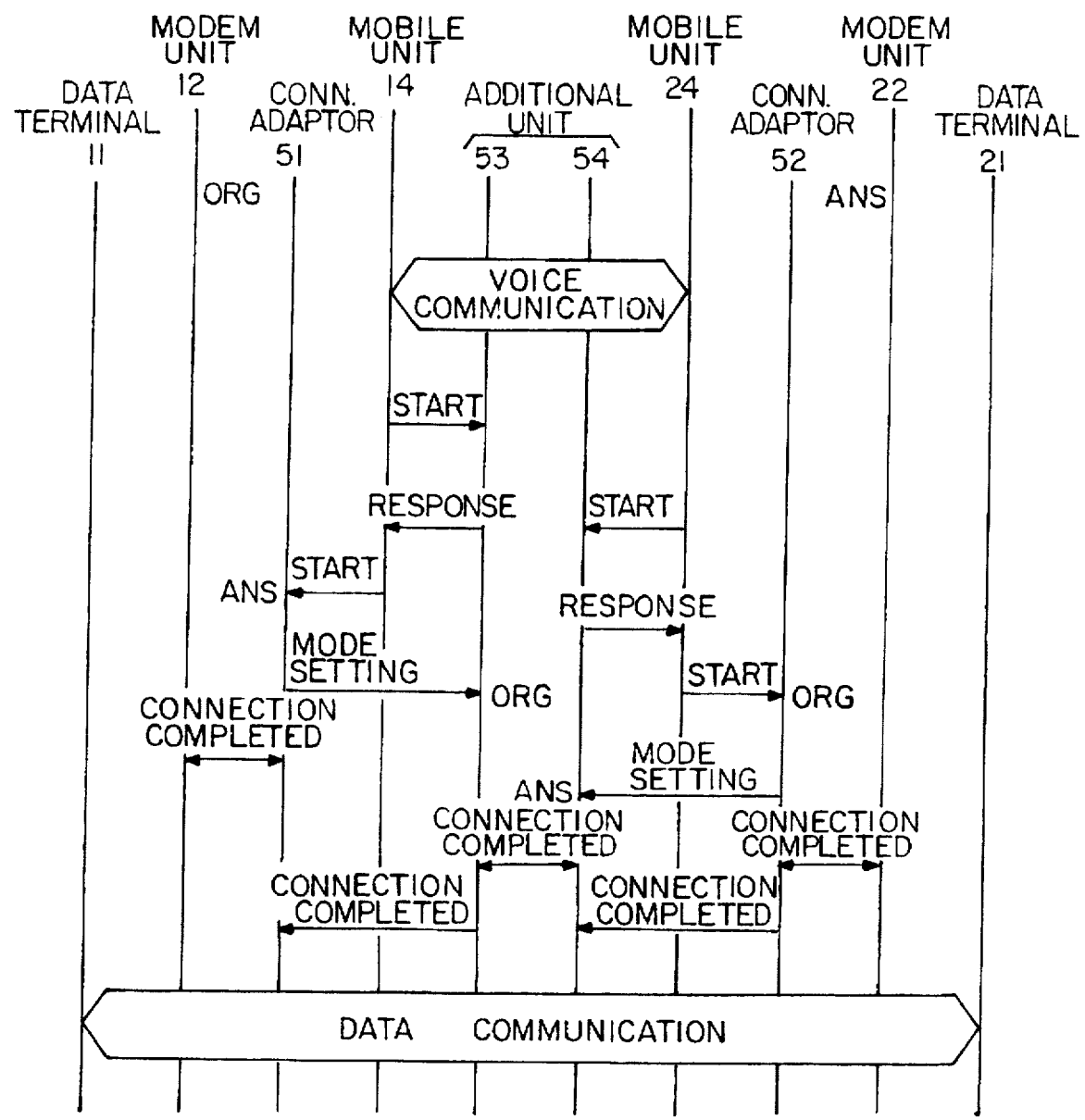
FIG. 2 is a connection sequence diagram for illustratively explaining operations of the mobile communication system up to a commencement of a data communication, according to the embodiment of the present invention.

FIG. 2 is a connection sequence diagram for showing operations of this mobile communication system prior to the commencement of the data communication between the mobile stations. In this case, it is now assumed that the modem unit 12 is preset to the originate mode whereas the modem unit 22 is preset to the answer mode, and in accordance with this preset condition, the connection adaptor 51 is set to the answer mode whereas the connection adaptor 52 is set to the originate mode by each mode set control parts 510 and 520.

First, when a transfer instruction to data communication (data communication commencement instruction) is inputted into the mobile unit 14 by a service user prior to the mobile unit 24, a data communication start request is issued from the mobile unit 14 to the mobile communication switching station 31, so that the mobile switching additional unit 53 is initiated by the mobile communication switching station 31, and then a response to this data communication start request is returned to the mobile unit 14.

In this case, the mode of the mobile switching additional unit 53 is not yet set as described before.

In response to this response, the connection adaptor 51 is initiated from the mobile unit 14 and the mode set control part 510 makes the mode of the connection adaptor 51 into the preset answer mode which is the opposite mode of the mode of the modem unit 12, and further a mode setting instruction is sent from the mode set control part 510 to the mobile switching additional unit 53 so as to set the mode into the originate mode which is the opposite mode of the mode of the connection adaptor 51. In response to this mode setting instruction, the switching additional unit 53 is brought into the originate mode.

In addition, since the modem unit 12 has been set to the originate mode, such a data transfer operation for directly transferring the data can be established between the modem unit 12 and the connection adaptor 51 in accordance with the existing call control sequence.

On the other hand, the transfer instruction to the data communication is also inputted by the other party of service user into the mobile unit 24 in a little later than the mobile unit 14. In response to this transfer instruction, the data communication start request is issued from the mobile unit 24 to the mobile communication switching station 32. Upon receipt of this request, the mobile switching additional unit 54 is initiated by the mobile communication switching station 32 but the mode of the mobile switching additional unit 54 is not yet set at this moment. Also, a response with respect to the data communication start request is returned from this mobile switching additional unit 54 to the mobile unit 24.

In response to this response, the connection adaptor 52 is initiated by the mobile unit 24 and the mode set control part 520 makes the connection adaptor 52 into the originate mode which is opposite mode of the modem unit 22, and further a mode setting instruction for setting the operation mode to the answer mode is delivered from the connection adaptor 52 (the mode set control part 520) to the mobile switching additional unit 54, so that the mobile switching additional unit 54 is brought into the answer mode, which is the opposite mode of the connection adaptor 52, by receiving this mode setting instruction at the mode set receiving part 540.

Now, since the mobile switching additional unit 53 is under originate mode, the data transfer operation can be established between the switching additional units 53 and 54 in accordance with the mobile existing call control sequence, and then a connection completion is issued from the mobile switching additional unit 53 operated under originate mode to the connection adaptor 51, whereby the data transfer operation can be established between the mobile switching additional unit 53 and the connection adaptor 51.

Moreover, since the modem unit 22 is set to the answer mode, the data transfer operation can be established between the connection adaptor 52 and the modem unit 22 in accordance with the existing call control sequence. Thus, the connection completion is sent from the connection adaptor 52 under the originate mode to the mobile switching additional unit 54, and then the data transfer operation can be established between the connection adaptor 52 and the mobile switching additional unit 54.

As a consequence, the data transfer operations could be established in all of the sections between the modem units 12 and 22, and then the data communication may be commenced by the data terminals 11 and 21.

As previously explained, in accordance with the mobile communication system of this embodiment, the modes of the connection adaptors 51 and 52 are set in the opposite mode to those of the modem units 12 and 22, and also such modes opposite to those of the own units are instructed and set to the mobile switching additional units 53 and 54 when initiated. As a result, the data transfer operations can be established between these units adjacent to each other irrelevant to the initiation sequences originated from the mobile units 14 and 24, and furthermore the modes set to the modem units 12 and 22, so that the data transfer operation can be established between the modem units 12 and 22, and thus the data communication made by the data terminals 11 and 21 can be firmly commenced.

It should be understood that although the above description has been made such that the mobile unit 14 using the modem unit 12 which has been set to the originate mode was initiated at first, the mobile unit 24 using the modem 22 which has been set to the answer mode may be initiated at first, resulting in a similar effect.

Also, the data communication has been established between the mobile stations 1 and 2 in the above-described embodiment. Alternatively, even when one of the data terminals is connected into the switching station, a similar effect to that of the above case may be achieved.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be constructed as included therein.

What is claimed is:

1. A mobile communication system for data communication by a data terminal and a modem (modulator/demodulator) unit connected to a mobile unit communicating with radio channels through a mobile communication network including base stations, mobile radio communication channel control stations and mobile communication switching stations, said mobile communication system comprising:

a plurality of mobile stations comprising
said mobile unit for communicating with radio channels to said one of base sations;
said data terminal for sending and receiving data information for data communication;
said modem unit for connecting said data terminal, modulating and demodulating data signals for appropriate signal mode transmission, and setting a communication direction mode to either of an originating mode or an answering mode; and
a connection adaptor for connecting said modem unit to said mobile unit by an initiation instruction of said mobile unit, setting said communication direction mode to an opposite mode of the mode being set in said modem unit, sending an instruction of said communication direction mode setting to said mobile communication switching station to set the opposite mode of the mode being set; and
a mobile switching additional unit for controlling communication sequences of data communication using modems, being connected to said mobile communication switching station and initiated by a mobile data communication request information sent from said mobile unit, and setting its own communication direction mode by the instruction sent by said connection adaptor through said mobile communication switching station.

2. A method for controlling a mobile communication system for data communication by a data terminal and a modem (modulator/demodulator) unit, having a communication direction mode of either of an originating mode or an answering mode, connected with a connection adaptor to a mobile unit communicating with radio channels through a mobile communication network including base stations, mobile radio communication channel control stations and mobile communication switching stations having a mobile switching additional unit for controlling communication sequences of data communication using modems, said method comprising the steps of:

requesting an initiation of data communication during voice communication through said mobile unit;

connecting said data terminal and modem to said mobile unit through said connection adaptor;

activating said mobile switching additional unit and making a path from said mobile switching additional unit to said connection adaptor;

setting said communication direction mode of said connection adaptor to an opposite mode of said mode being set to said modem;

sending an instruction of setting a communication direction mode from said connection adaptor to said mobile switching additional unit to an opposite mode of said mode having been set to said connection adaptor; and setting said communication direction mode of said mobile switching additional unit to a mode being instructed.

* * * * *